US011415835B2

(12) United States Patent
Steinbauer

(10) Patent No.: US 11,415,835 B2
(45) Date of Patent: Aug. 16, 2022

(54) SOLAR BACKLIT LIQUID CRYSTAL DISPLAY COMPUTER MONITOR

(71) Applicant: Sven Steinbauer, Random Lake, WI (US)

(72) Inventor: Sven Steinbauer, Random Lake, WI (US)

( * ) Notice: Subject to any disclaimer, the term of this patent is extended or adjusted under 35 U.S.C. 154(b) by 163 days.

(21) Appl. No.: 16/543,522

(22) Filed: Aug. 17, 2019

(65) Prior Publication Data

US 2021/0048713 A1 Feb. 18, 2021

Related U.S. Application Data

(60) Provisional application No. 62/878,389, filed on Jul. 25, 2019.

(51) Int. Cl.
*G02F 1/1333* (2006.01)
*G02F 1/1335* (2006.01)
*G02F 1/13357* (2006.01)

(52) U.S. Cl.
CPC .. *G02F 1/133606* (2013.01); *G02F 1/133308* (2013.01); *G02F 1/133618* (2021.01)

(58) Field of Classification Search
None
See application file for complete search history.

(56) References Cited

U.S. PATENT DOCUMENTS

| | | | | |
|---|---|---|---|---|
| 5,479,276 A * | 12/1995 | Herbermann | ............ | F21S 11/00 349/5 |
| 6,795,137 B1 * | 9/2004 | Whitted | ................ | G02F 1/1336 349/68 |
| 7,110,062 B1 * | 9/2006 | Whitted | ................ | G02F 1/1336 349/68 |
| 7,427,140 B1 * | 9/2008 | Ma | ........................ | G06F 1/1616 353/30 |
| 9,062,817 B1 * | 6/2015 | Housman | ............... | F16M 13/02 |
| 2006/0000634 A1 * | 1/2006 | Arakawa | ............... | F21V 21/104 174/128.1 |
| 2007/0171322 A1 * | 7/2007 | Shin | ...................... | G06F 1/3265 349/58 |
| 2007/0195519 A1 * | 8/2007 | Shin | .................... | G02B 6/0055 362/125 |
| 2010/0073791 A1 * | 3/2010 | Mahowald | ............. | G02B 6/001 359/872 |
| 2010/0141869 A1 * | 6/2010 | Biernath | ........... | G02F 1/133605 349/64 |
| 2010/0177025 A1 * | 7/2010 | Nagata | ...................... | G09F 9/35 345/76 |

(Continued)

OTHER PUBLICATIONS

YouTube video titled "Howto hide your TV in the ceiling" by Bengineering, published on Aug. 7, 2016, and available at https://www.youtube.com/watch?v=TjbZqST4PKU. (Year: 2016).*

*Primary Examiner* — Daniel J Colilla

(57) ABSTRACT

Liquid crystal displays in computer monitors require a source of backlight, in which light emitting diodes are the most widely used, however these electric light sources can cause eye strain after prolonged viewing. In order to provide an alternative to desktop computer users which are in front of LCD displays for most of the day, the present invention supplies a way to use natural solar backlight from a nearby window or candle to completely eliminate such strain.

1 Claim, 6 Drawing Sheets

(56) References Cited

U.S. PATENT DOCUMENTS

| | | | |
|---|---|---|---|
| 2011/0222218 A1* | 9/2011 | Kim | H04N 5/65 |
| | | | 361/679.01 |
| 2012/0127401 A1* | 5/2012 | Biernath | G02F 1/133605 |
| | | | 349/68 |
| 2014/0043565 A1* | 2/2014 | Ma | G02F 1/133602 |
| | | | 349/67 |
| 2015/0009449 A1* | 1/2015 | Ito | G02B 6/0088 |
| | | | 349/58 |

* cited by examiner

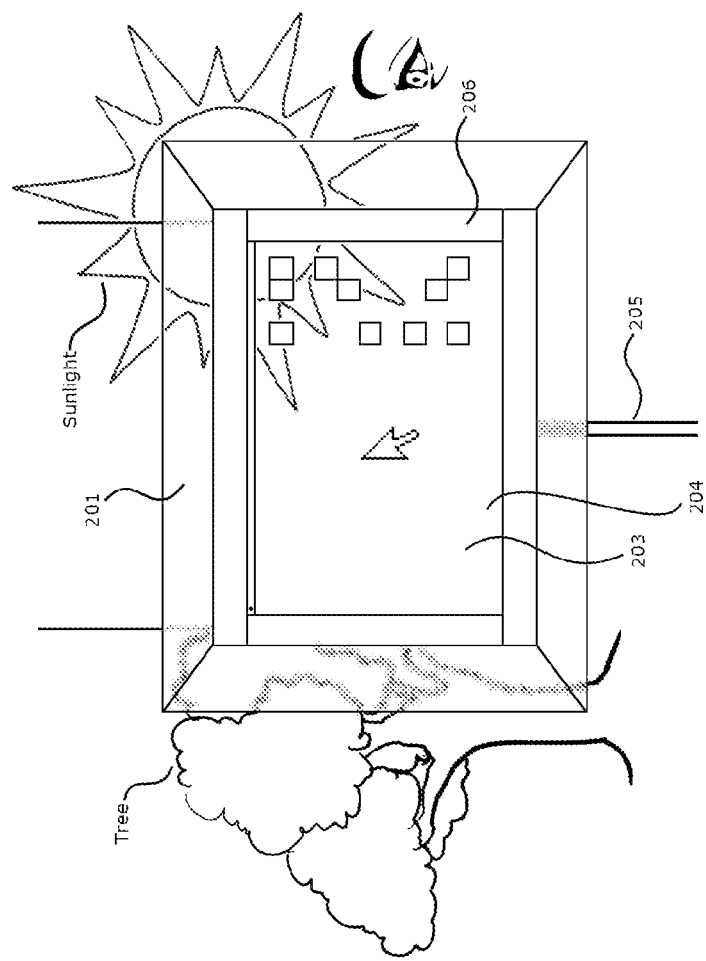

SOLAR BACKLIT LIQUID CRYSTAL DISPLAY COMPUTER MONITOR

CROSS-REFERENCE OF RELATED APPLICATIONS

This application claims the benefit of U.S. Provisional Application No. 62/878,389, filed Jul. 25 2019.

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

STATEMENT REGARDING PRIOR DISCLOSURES BY THE INVENTOR OR A JOINT INVENTOR

"Not Applicable"

BACKGROUND OF THE INVENTION

1. Field of the Invention

The present invention relates to the field of backlit liquid crystal displays, and in particular to liquid crystal display backlight sources. Related sectors are 349/64, 345/102, and 362/97.2

2. Description of Related Arts

The light source used in LCD (Liquid Crystal Displays) in computer monitors require a source of backlight in which LEDs (Light emitting diodes) are presently the most widely used. The LED does have the advantage of high energy efficiency and small space requirements. However, white LED light also emits a substantial amount of blue light which produces eye strain after prolonged viewing, and has been shown to cause eye problems after decades of use.

Electric illumination was discovered relatively recently, and the Human eye has been adapted to natural sources of light such as the Sun and fire since prehistoric times, this may be the reason of such strain. Reflective e-paper displays have been shown to reduce eye strain significantly, but are still limited in chromatic palette and refresh rate, and are mostly used only in e-book readers. The present invention provides an alternative by making use of solar and fire light instead, which completely eliminates eye strain, reduces energy consumption, and further increases color rendering quality.

BRIEF SUMMARY OF THE INVENTION

The objective of the invention is to provide solar backlight to a liquid crystal display in order to provide an alternative to computer users, which are in front of LCD displays for most of the day, and are afflicted by the eye strain. In order to resolve the above described, the present invention provides a semi-transparent diffusing screen in the back of an LCD display, both mounted with a sturdy frame, allowing the light of the Sun to pass through and illuminate the digital content. It eliminates strain because the electronic light is removed altogether, and makes use of the luminescence of the Sun instead. The LCD display has to be placed in front of a window, preferably facing south if living north of the equator, and can be used from sunrise to sunset even in cloudy days. If light is needed when there is no sunlight available, a candle may also be used as a backlight.

BRIEF DESCRIPTION OF THE SEVERAL VIEWS OF THE DRAWINGS

In order to give a better understanding of the technical solution in the present invention, a brief description of the preferred embodiment is given below along with the attached drawings:

FIG. 1 is a cross-sectional view showing the liquid crystal display 100, the semi-transparent diffusing screen 102, and the frame 104.

FIG. 2 is a perspective view showing the arrangement of the liquid crystal display 100, the semi-transparent diffusing screen 102, and the frame 104;

FIG. 3 is a exploded view showing the arrangement of the liquid crystal display 100, the semi-transparent diffusing screen 102, and the frame 104.

FIG. 6 shows the front view of the invention suspended form above, the use of props in the drawing serve to illustrate the types of transparency in the materials.

Figure 1:
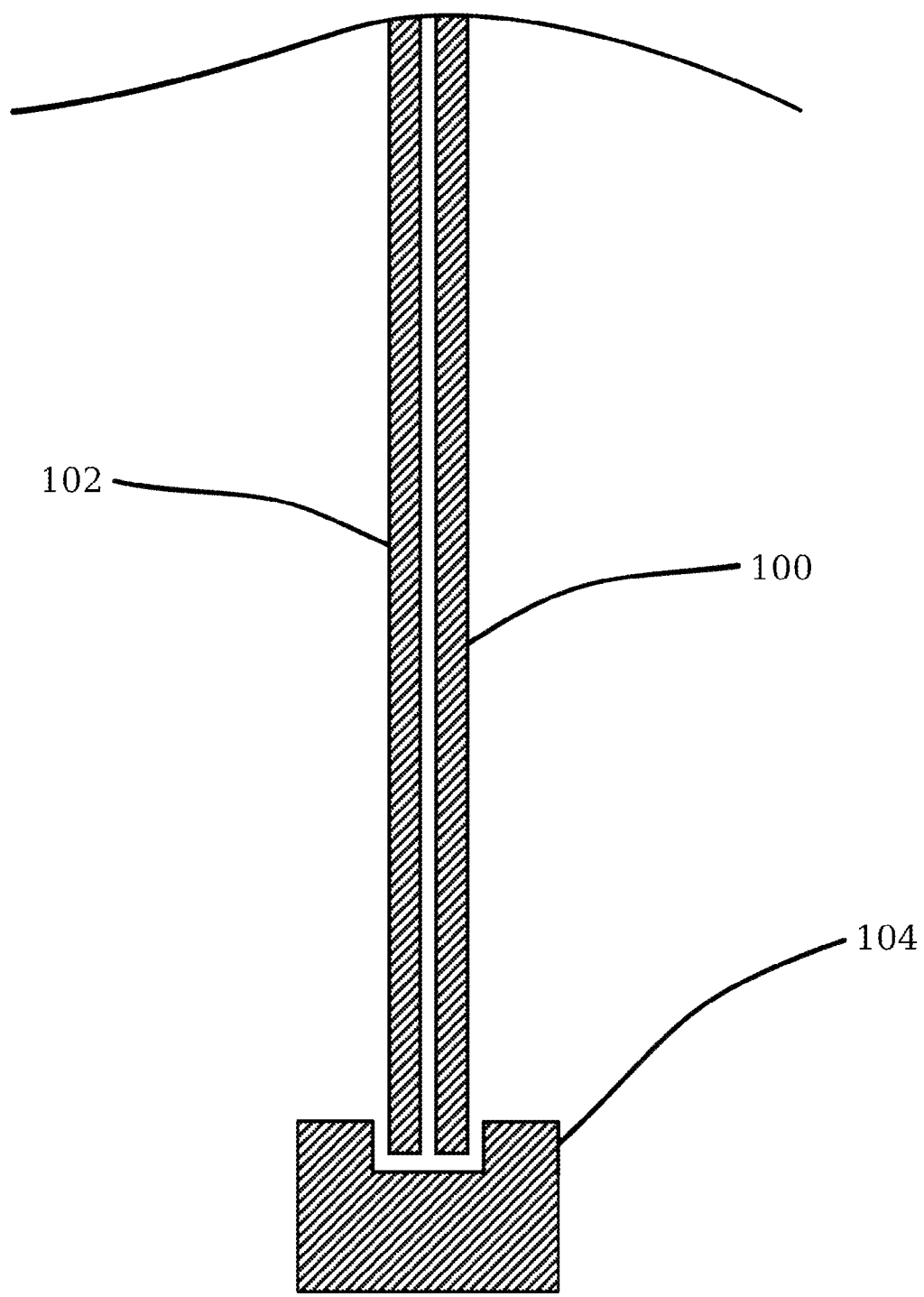
Referring to FIGS. 1-3, the present invention consists of a liquid crystal display 100, a semi-transparent diffusing screen 102, and a frame 104 mounting both.
Figure 2:
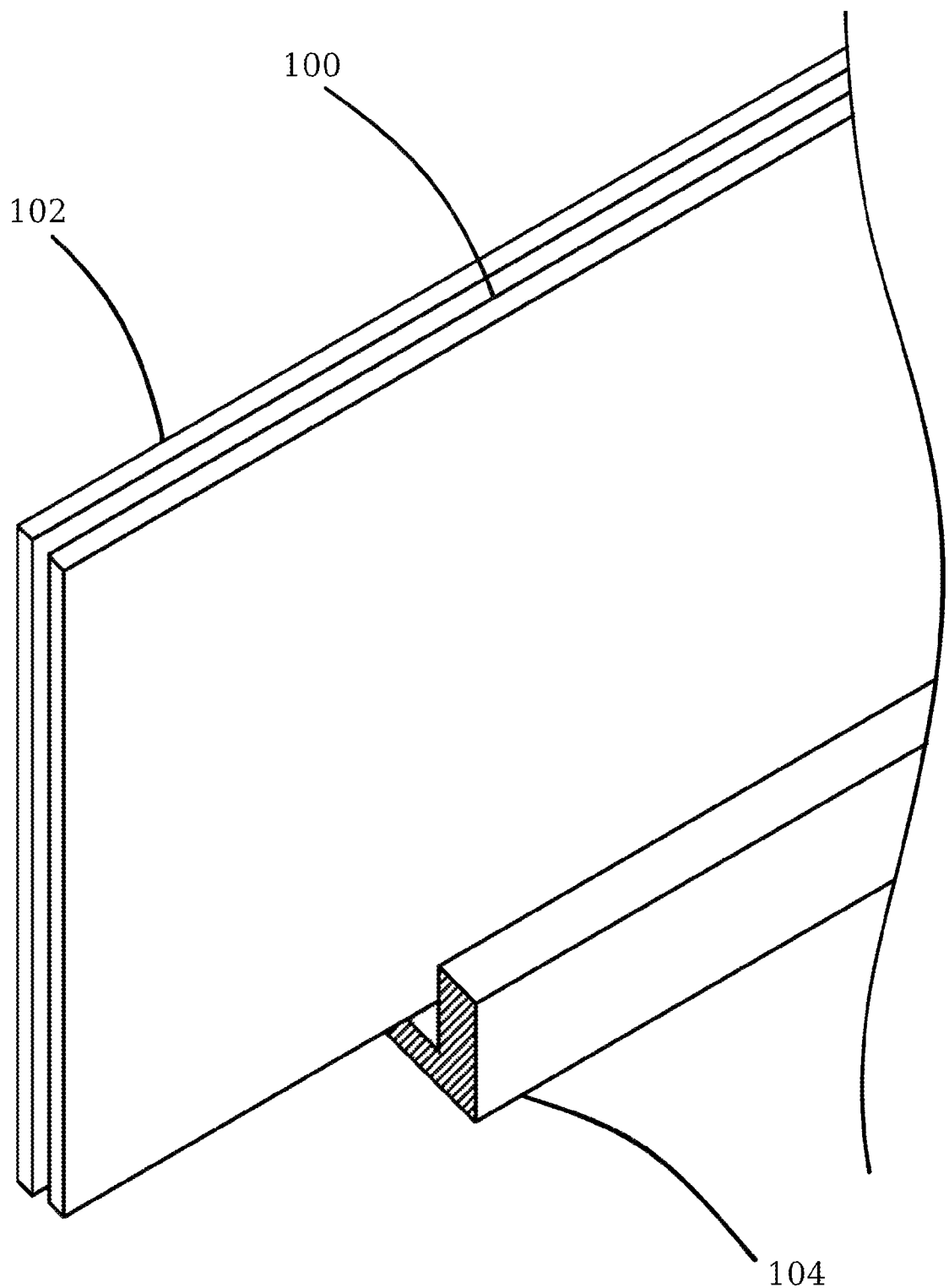
Figure 3:
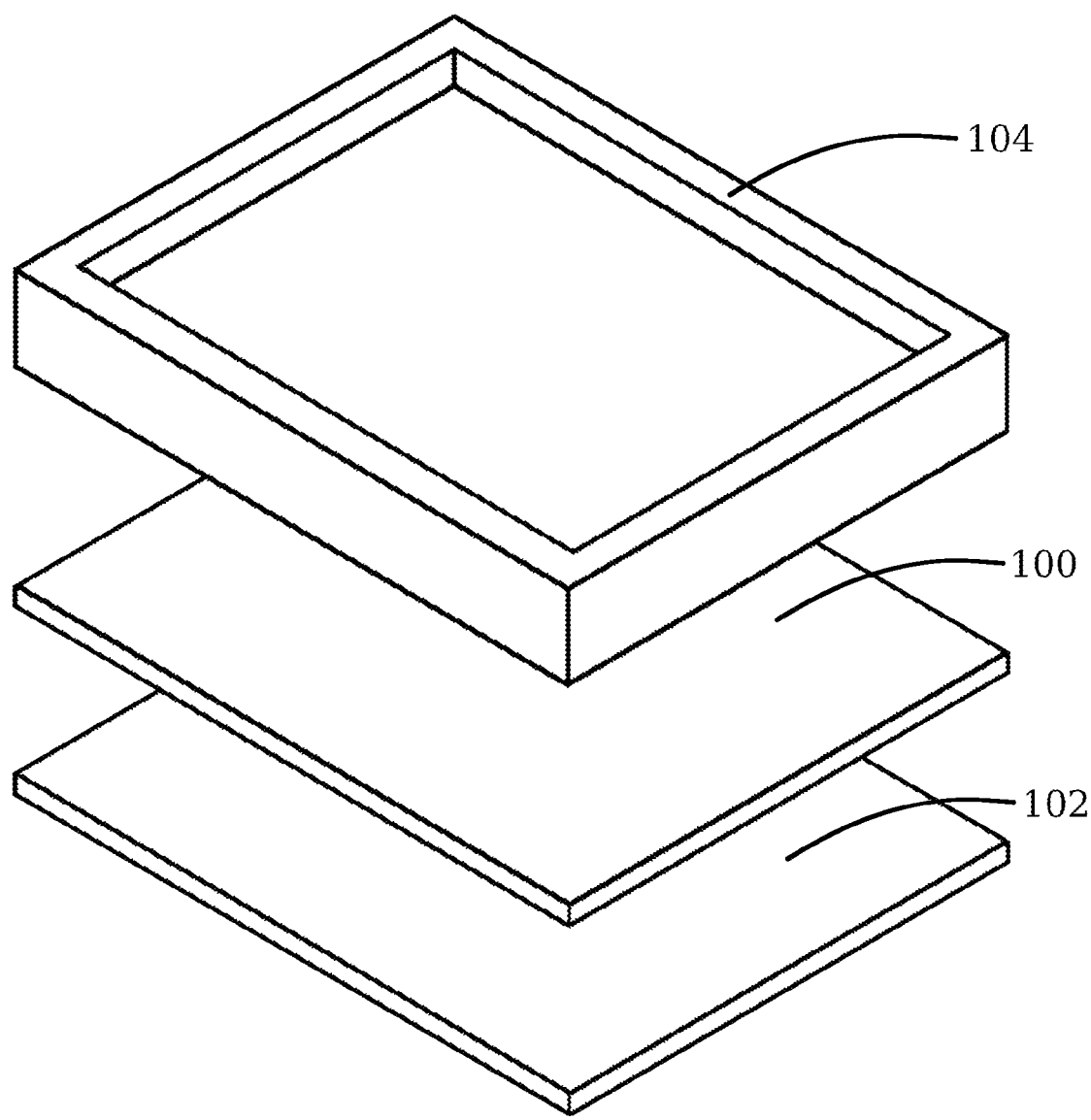
Figure 4:
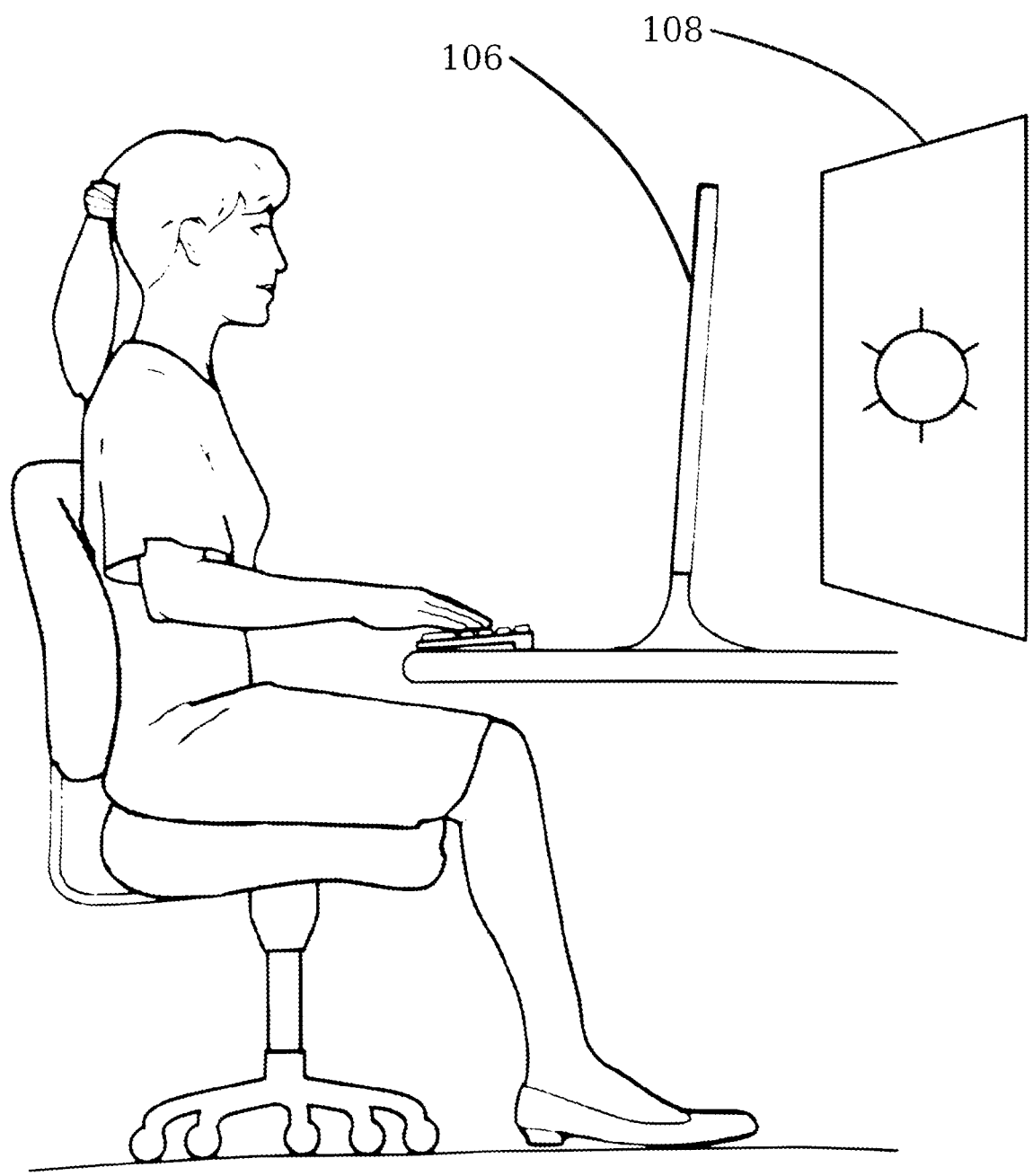
FIG. 4 illustrates the use of present invention 106, placed in front of a sunny window 108.
Figure 5:
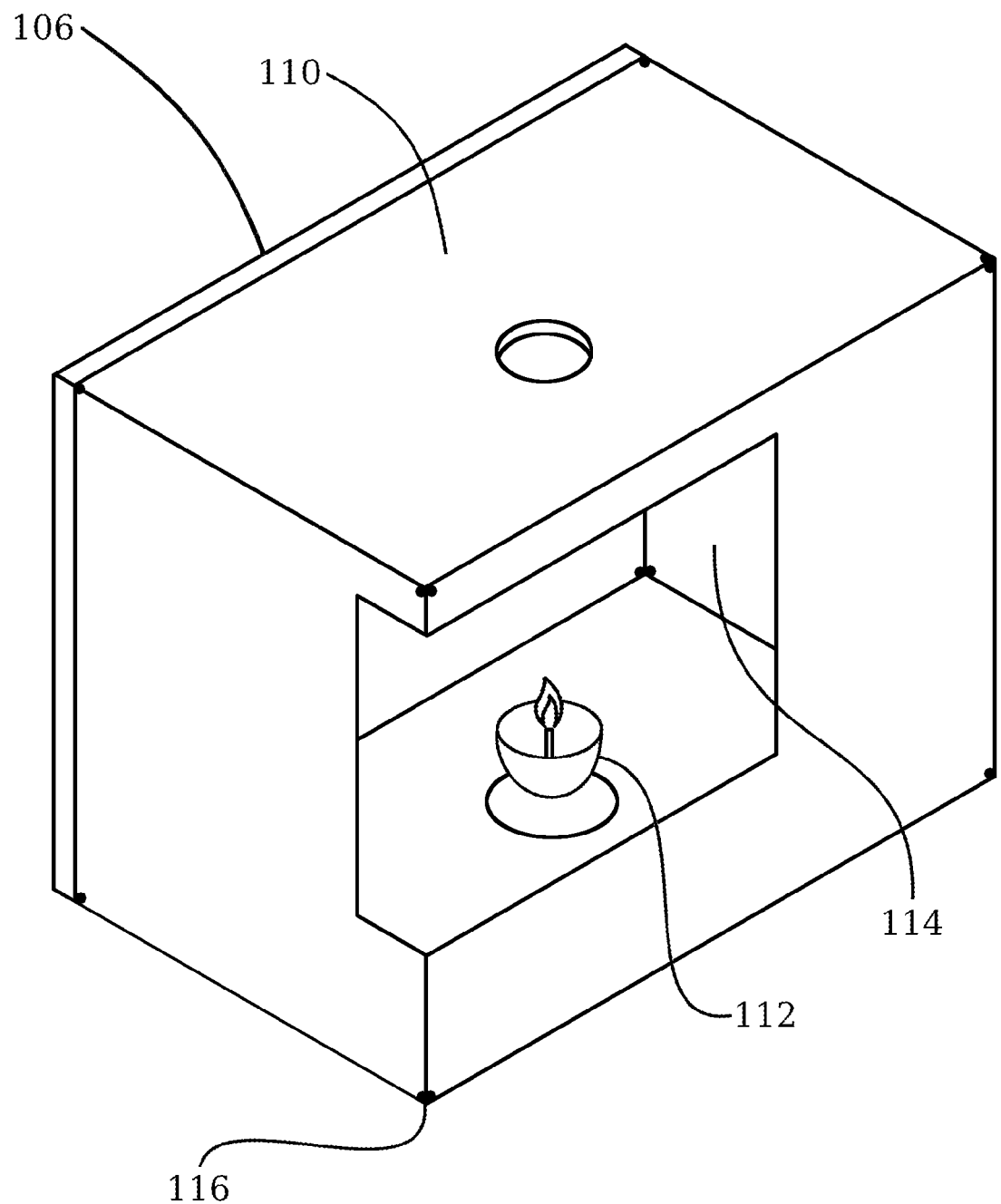
FIG. 5 is a perspective view showing the present invention 106, a folding box 110, joined with magnets 116, an oil lamp 112, and reflective material inside the box 114.

201 is the Sunlight diffusing curtain placed on the sides of the frame, 203 is the LCD panel, 204 is the diffusing semi transparent screen on the back of the LCD screen, which permits light thru but not the view, 205 are the electrical cables that connect to the computer, energy source, or human interface devices, 206 is the wooden frame sustaining the whole apparatus.

DETAILED DESCRIPTION OF THE INVENTION

To further elaborate the solution adopted in the present invention, a detailed description will be given. The present invention is a Sun backlit digital computer color monitor which comprises a modified LCD (Liquid Crystal Display) module in which the artificial lighting, the refracting lenses, mirrors, and back cover has been completely removed, and replaced with a semi-transparent diffusing screen placed in the back of the LCD display glass, to allow only light to pass thru, but not the back view. The LCD and the semi-transparent diffusing screens are then mounted on the frame made of wood, wood is an optimal element because this monitor is placed right in front of a glass window, and this material is not hard enough to fracture glass like metal, and does not crack or break when continuously exposed to Sunlight for years like plastic. The cables, ports, and electronic control board from the LCD module are then affixed in the frame, or may also be in their own separate box. The invention may be either resting on a table or suspended from above, because Sunlight is coming directly from the front of the monitor and well beyond its outer perimeter, to prevent eye strain due to the glare that occurs when seeing something with vastly different light intensities at the same time, the invention mildly blocks excess Sun light around it with a curtain. The invention paves the way into a more healthy manner of using a computer monitor by being synchronized with the Sun position, usage time would be restricted to daylight hours e.g. 7am-7pm, and the user's workplace location would also be restricted to be in front of a window with access to Sun light, this will increase the user's health both physically and psychologically, eliminating eye strain while further increasing energy consumption.

A computer monitor that provides an alternative to users which are in front of LCD displays for most of the day and are afflicted by the eye strain due to the LED backlight. Comprising of a liquid crystal display module, a semi-transparent diffusing screen, a frame to mount both, and a light box.

The invention claimed is:

1. A solar backlit LCD (liquid crystal display) digital monitor that eliminates eye and psychological strain, while further reducing energy consumption, accomplished by the complete removal of artificial sources of light, forcing the only source of backlight to be from sunlight alone, that shines through a window comprising of:
- a liquid crystal display panel;
- a semi-transparent diffusing screen placed in the back of said liquid crystal display panel, wherein said liquid crystal display panel and said semi-transparent diffusing screen are placed inside a frame; and
- a light filtering curtain placed around the entire periphery of the frame.

\* \* \* \* \*